US012007083B2

(12) United States Patent
Lin et al.

(10) Patent No.: US 12,007,083 B2
(45) Date of Patent: Jun. 11, 2024

(54) SIMULATED CANDLE

(71) Applicant: TAIZHOU SANBRITE TRADING COMPANY LIMITED, Taizhou (CN)

(72) Inventors: Encai Lin, Taizhou (CN); Ke Sun, Taizhou (CN); Yunbing Weng, Taizhou (CN)

(73) Assignee: TAIZHOU SANBRITE TRADING COMPANY LIMITED, Taizhou (CN)

( * ) Notice: Subject to any disclaimer, the term of this patent is extended or adjusted under 35 U.S.C. 154(b) by 0 days.

(21) Appl. No.: 18/382,487

(22) Filed: Oct. 21, 2023

(65) Prior Publication Data

US 2024/0044467 A1 Feb. 8, 2024

(30) Foreign Application Priority Data

Sep. 4, 2023 (CN) ......................... 202311140645.0

(51) Int. Cl.
*F21S 10/04* (2006.01)
*F21S 6/00* (2006.01)
*F21V 21/088* (2006.01)

(52) U.S. Cl.
CPC ............. *F21S 10/043* (2013.01); *F21S 6/001* (2013.01); *F21V 21/088* (2013.01)

(58) Field of Classification Search
CPC .. F21S 10/043; F21S 6/001; F21S 4/10; F21S 4/15
See application file for complete search history.

(56) References Cited

U.S. PATENT DOCUMENTS

| | | | | |
|---|---|---|---|---|
| 1,060,278 | A * | 4/1913 | Nelson | F21S 6/001 439/123 |
| 2007/0223216 | A1* | 9/2007 | Jensen | F21V 17/06 362/161 |
| 2010/0195332 | A1* | 8/2010 | Wasem | F21S 4/10 362/249.16 |
| 2011/0255272 | A1 | 10/2011 | Privas | |
| 2018/0003352 | A1* | 1/2018 | Cao | F21V 23/02 |
| 2019/0032877 | A1 | 1/2019 | Chen et al. | |
| 2019/0338906 | A1 | 11/2019 | Ganz et al. | |
| 2021/0080070 | A1* | 3/2021 | Chiang | F21K 9/232 |

FOREIGN PATENT DOCUMENTS

| | | | | |
|---|---|---|---|---|
| DE | 202019101499 U1 * | 8/2019 | F21S 6/001 |
| DE | 202020100175 U1 * | 4/2020 | F21S 10/043 |
| EP | 4105548 A1 * | 12/2022 | F21S 6/001 |
| WO | WO-2018055386 A1 * | 3/2018 | F21S 10/043 |

* cited by examiner

*Primary Examiner* — Alexander K Garlen
(74) *Attorney, Agent, or Firm* — Shen Huang

(57) ABSTRACT

Disclosed in the present disclosure is a simulated candle, including a simulated candle end, wherein the simulated candle end includes a flame simulating member, a light-emitting element, a simulating member for a cotton sewing thread on a candle wick, a circuit board, and a candle end bottom support. The flame simulating member includes a light transmissive profiled cover shell, and a bottom of the profiled cover shell is provided with an embedding groove. The candle end bottom support is positioned below the flame simulating member, and a bottom support receiving cavity for receiving the circuit board is formed in the candle end bottom support. The simulated candle of the present disclosure can effectively inhibit the offset of the light-emitting element, and improve its simulation effect.

9 Claims, 17 Drawing Sheets

SIMULATED CANDLE

TECHNICAL FIELD

The present disclosure relates to the technical field of electronic light-emitting devices, in particular to a simulated candle.

BACKGROUND

A simulated candle is an electronic light-emitting device that simulates the burning of a traditional candle with a wick, and is commonly used in some specific occasions to create an atmosphere. Because the simulated candle does not require the use of fire during use, it is more safe to use compared with conventional candles. However, the simulation effect of the existing simulated candle is not ideal, and the position of a light-emitting element is easily offset, resulting in a poor simulation effect of a real flame.

SUMMARY

In order to overcome the above disadvantages, an object of the present disclosure is to provide a simulated candle which can effectively inhibit the offset of a light-emitting element, and improve its simulation effect.

In order to achieve the above object, the technical solution adopted by the present disclosure is as follows: provided is a simulated candle, including a simulated candle end, wherein the simulated candle end includes a flame simulating member, a light-emitting element, a simulating member for a cotton sewing thread on a candle wick, a circuit board, and a candle end bottom support; wherein

- the flame simulating member includes a light transmissive profiled cover shell, and a bottom of the profiled cover shell is provided with an embedding groove;
- the light-emitting element is embedded in the embedding groove, and is connected to the circuit board located outside the profiled cover shell through the simulating member for a cotton sewing thread on a candle wick;
- the simulating member for a cotton sewing thread on a candle wick includes at least two strands of wires twisted into a fried dough twist shape, and each strand of the wires includes an electric core wire and a simulation rubber sleeve wrapped outside the electric core wire; and
- the candle end bottom support is positioned below the flame simulating member, and a bottom support receiving cavity for receiving the circuit board is formed in the candle end bottom support.

The beneficial effects of the present disclosure are as follows:

- by embedding the light-emitting element into the embedding groove, the embedding groove can be used to inhibit movement of the light-emitting element, thereby avoiding the offset of the light-emitting element during use; then the light-emitting element is connected with the circuit board through the simulating member for a cotton sewing thread on a candle wick to realize the control of the luminous effect of the light-emitting element, and then light of the light-emitting element is transmitted out through the light transmissive profiled cover shell to achieve the effect of simulating a candle flame; since the circuit board is located outside the profiled cover shell, the simulating member for a cotton sewing thread on a candle wick can be partially exposed outside the profiled cover shell when the simulating member for a cotton sewing thread on a candle wick connects the light-emitting element to the circuit board, thereby being capable of simulating the effect of a cotton sewing thread on a candle wick; in the simulating member for a cotton sewing thread on a candle wick, the electrical connection of the light-emitting element to the circuit board is realized by the electric core wires, and not only can the insulating effect between the electric core wires be ensured, but also a cotton sewing thread on a candle wick of the candle can be simulated by the simulation rubber sleeves; and then the simulation effect of the cotton sewing thread on the candle wick is further enhanced by twisting the wires into a fried dough twist shape. In addition, the flame simulating member, the simulating member for a cotton sewing thread on a candle wick, and the circuit board can be supported by the setting of the candle end bottom support, so as to ensure the position stability of the flame simulating member, the simulating member for a cotton sewing thread on a candle wick, and the circuit board.

Further, the wires are bonded and fixed by a glue, so as to avoid turning of the wires due to torsion when a plurality of wires are twisted into a fried dough twist shape, and ensure the shape stability of the plurality of the wires twisted.

Further, the embedding groove is located in a middle of the profiled cover shell, and a shape of an inner side wall of the embedding groove is adapted to a shape of an outer side wall of the light-emitting element. By adapting the shape of the embedding groove to the shape of the light-emitting element, the embedding groove can better limit the position of the light-emitting element, and meanwhile, the embedding groove is formed in the middle of the profiled cover shell, so that the light-emitting element can be located on a center line of the profiled cover shell, thereby allowing the position of the light-emitting element to be closer to a wick position of a real candle.

Further, the simulated candle further includes a simulated candlestick positioned under the simulated candle end, wherein the simulated candlestick includes a hollow housing, and an upper end of the hollow housing is detachably connected with the candle end bottom support.

Further, the candle end bottom support includes an upper support plate and a lower sleeve which are integrally formed, an outer diameter of the upper support plate is greater than that of the lower sleeve, and the upper support plate is able to abut against an upper end face of the hollow housing when the lower sleeve is embedded into the hollow housing. By embedding the lower sleeve into the hollow housing, the stability of assembly of the lower sleeve with the hollow housing can be improved.

Further, the upper support plate is of a plane shape, and a support plate perforated hole for allowing the simulating member for a cotton sewing thread on a candle wick to pass through is formed in a middle of the upper support plate.

Further, the middle of the upper support plate protrudes toward a direction close to the flame simulating member, and a circular truncated cone-shaped protrusion is formed, and a support plate perforated hole for allowing the simulating member for a cotton sewing thread on a candle wick to pass through is formed in a middle of the protrusion.

Further, the simulated candle further includes a power supply assembly built inside the hollow housing or detachably connected at a lower end of the hollow housing; wherein the power supply assembly is electrically connected with the circuit board.

Further, the simulated candlestick further includes a candlestick base, and a radial dimension of a lower end of the candlestick base is greater than that of an upper end of the candlestick base. The bottom support of the simulated candlestick can be enhanced by the setting of the candlestick base to facilitate its stable placement on a table top.

Further, the simulated candlestick further includes a moving assembly, the moving assembly includes a moving clip, and the moving clip includes a clip body and a support platform fixedly connected to the clip body; and a lower end of the hollow housing is detachably connected with a connecting seat capable of being embedded into the support platform. It is convenient to move the simulated candle end and the simulated candlestick to any clippable position by the setting of the moving assembly, improving the convenience of use; and during use, the connecting seat is first connected to the hollow housing, the moving clip is then clamped to a desired position, and the connecting seat connected to the hollow housing is then placed on the support platform.

Figure 1:
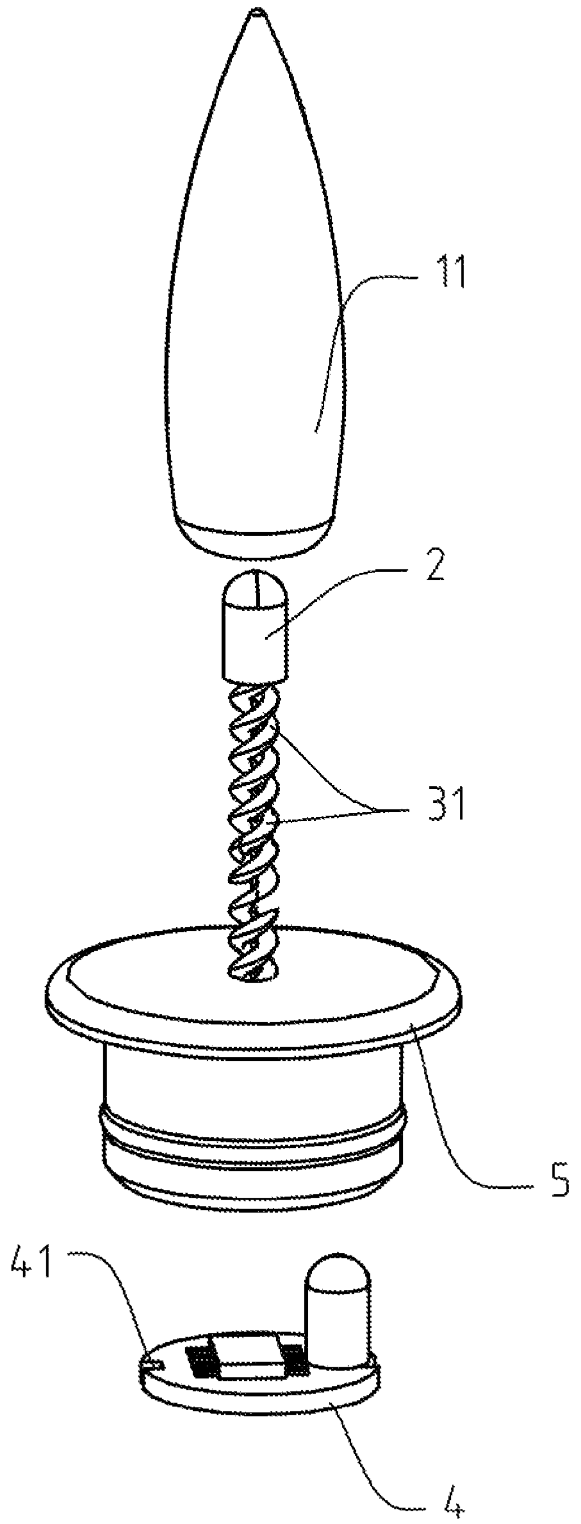
FIG. 1 is an exploded view of a simulated candle end according to one embodiment of the present disclosure.

1—flame simulating member; 11—profiled cover shell; 12—embedding groove;

2—light-emitting element;

3—simulating member for cotton sewing thread on candle wick; 31—wire;

4—circuit board; 41—gap;

5—candle end bottom support; 51—upper support plate; 511—support plate perforated hole; 512—protrusion; 52—lower sleeve; 521—annular flange; 522—limiting rib;

6—simulated candlestick; 61—hollow housing; 611—external thread structure; 62—connecting seat; 621—anti-slip convex thread; 663—fixed rod; 64—candlestick base; 65—protective casing; 66—moving clip; 661—clip body; 662—support platform;

7—dry battery; and

8—battery case.

DETAILED DESCRIPTION

The preferred embodiments of the present disclosure are described in detail below with reference to the accompanying drawings so that the advantages and features of the present disclosure will be more readily understood by those skilled in the art, and thus the protection scope of the present disclosure will be more clearly and definitely defined.

In the description of the present disclosure, the terms "upper", "lower", "top", "bottom", "length", "width", "thickness" and the like indicating the directional or positional relationships are based on the directional or positional relationships shown in the drawings, and the terms "inner" and "outer", which refer to directions toward or away from the geometric center of a particular component, respectively, are merely for convenience of description and do not indicate or imply that the device or element must have a particular orientation, and be constructed and operated in a particular orientation, and therefore are not to be construed as limiting the present disclosure. Moreover, the terms "first" and "second" are used for descriptive purposes only and are not to be construed as indicating or implying relative importance.

It should also be noted that in the description of the present disclosure, unless expressly specified and limited otherwise, the terms "disposed", "provided with", "mounted", "connected", "fixed" and the like should be understood in a broad sense, for example, it may be fixedly connected, removably connected, or integrally connected; it may be directly connected or indirectly connected through other components; and it may be mechanically connected or electrically connected. The specific meaning of the above terms in the present disclosure can be understood by those skilled in the art according to specific circumstances. In addition, the drawings are all in a very simplified form and all use imprecise ratios only for the purpose of conveniently and clearly assisting in describing of the embodiments of the present disclosure.

Embodiment

Figure 2:
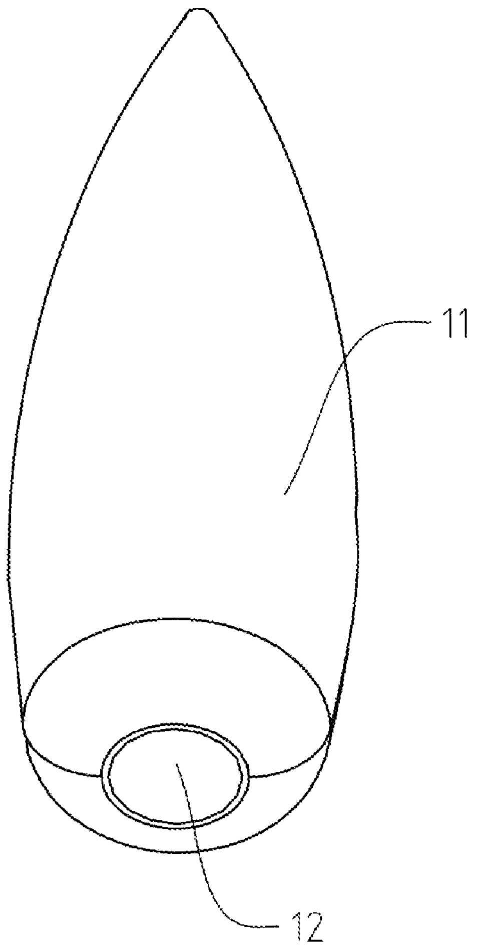
FIG. 2 is a structural schematic diagram of a profiled cover shell according to one embodiment of the present disclosure.
Figure 6:
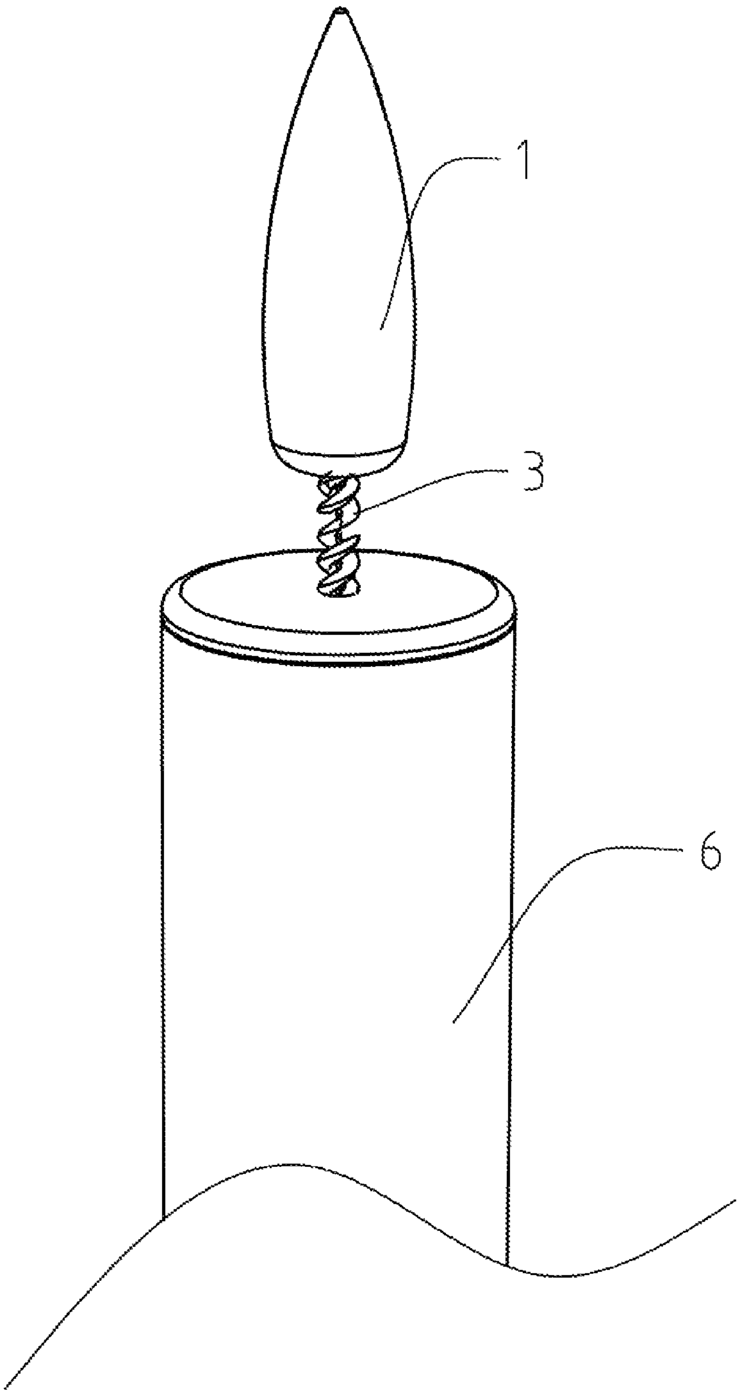
FIG. 6 is a structural schematic diagram of assembly of a simulated candle end to a simulated candlestick according to one embodiment of the present disclosure.

Referring to FIGS. 1-2 and 6, a simulated candle according to the present disclosure includes a simulated candle end including a flame simulating member 1, a light-emitting element 2, a simulating member for a cotton sewing thread on a candle wick 3, and a circuit board 4, wherein the flame simulating member 1 includes a light transmissive profiled cover shell 11, and a bottom of the profiled cover shell 11 is provided with an embedding groove 12. The light-emitting element 2 is embedded in the embedding groove 12, and is connected to the circuit board 4 located outside the profiled cover shell 11 through the simulating member for a cotton sewing thread on a candle wick 3. The simulating member for a cotton sewing thread on a candle wick 3 includes at least two strands of wires 31 twisted into a fried dough twist shape, and each strand of the wires 31 includes an electric core wire and a simulation rubber sleeve wrapped outside the electric core wire.

By embedding the light-emitting element 2 into the embedding groove 12, the embedding groove 12 can be used to inhibit movement of the light-emitting element 2, thereby avoiding the offset of the light-emitting element 2 during use; then the light-emitting element 2 is connected with the circuit board 4 through the simulating member for a cotton sewing thread on a candle wick 3 to realize the control of the luminous effect of the light-emitting element 2, and then light of the light-emitting element 2 is transmitted out through the light transmissive profiled cover shell 11 to achieve the effect of simulating a candle flame; since the circuit board 4 is located outside the profiled cover shell 11, the simulating member for a cotton sewing thread on a candle wick 3 can be partially exposed outside the profiled cover shell 11 when the simulating member for a cotton sewing thread on a candle wick 3 connects the light-emitting element 2 to the circuit board 4, thereby being capable of simulating the effect of a cotton sewing thread on a candle wick; in the simulating member for a cotton sewing thread on a candle wick 3, the electrical connection of the light-emitting element 2 to the circuit board 4 is realized by the electric core wires, and not only can the insulating effect between the electric core wires be ensured, but also a cotton sewing thread on a candle wick of the candle can be simulated by the simulation rubber sleeves; and then the simulation effect of the cotton sewing thread on the candle wick is further enhanced by twisting the wires 31 into a fried dough twist shape. It should be noted that each simulating rubber sleeve adopts a black rubber sleeve to enhance its simulating effect. The flame simulating member 1, the simulating member for a cotton sewing thread on a candle wick 3, and the circuit board 4 can be supported by the setting of a candle end bottom support 5, so as to ensure the position stability of the flame simulating member 1, the simulating member for a cotton sewing thread on a candle wick 3, and the circuit board 4.

In the simulating member for a cotton sewing thread on a candle wick 3, the number of the wires 31 can be adjusted according to actual requirements and is not limited by this embodiment. For convenience of description, in the following embodiments, two strands of the wires 31 are used. The torsion on the wires 31 may cause turning when the wires 31 are twisted into a fried dough twist shape, thus leading to the phenomenon that the plurality of the wires 31 are loosely twisted. In order to avoid this phenomenon, in some embodiments, the plurality of the wires 31 are bonded and fixed by a glue. In actual operation, the glue is first applied to the simulation rubber sleeves of the wires 31, and then a plurality of strands of the wires 31 are twisted into a fried dough twist shape. When the wires 31 are twisted into a proper position, both ends of the wires 31 are fixed until the glue is cured.

In some embodiments, as shown in FIG. 2, a contour of the profiled cover shell 11 is similar to a shape of a flame when the candle is burning, i.e., a radial dimension of a side wall at an upper end of the profiled cover shell 11 gradually decreases from bottom to top.

In some embodiments, the embedding groove 12 is located in a middle of the profiled cover shell 11, and a shape of an inner side wall of the embedding groove 12 is adapted to a shape of an outer side wall of the light-emitting element 2. By adapting the shape of the embedding groove 12 to the shape of the light-emitting element 2, the embedding groove 12 can better limit the position of the light-emitting element 2, and meanwhile, the embedding groove 12 is formed in the middle of the profiled cover shell 11, so that the light-emitting element 2 can be located on a center line of the profiled cover shell 11, thereby allowing the position of the light-emitting element 2 to be closer to a wick position of a real candle. Exemplarily, the light-emitting element 2 may employ lamp beads of 3 mm.

In some embodiments, referring to FIG. 1, the simulated candle end further includes a candle end bottom support 5, wherein the candle end bottom support 5 is positioned below the flame simulating member 1, and a bottom support receiving cavity for receiving the circuit board 4 is formed in the candle end bottom support 5. The simulated candle end can be supported by the setting of the candle end bottom support 5 to ensure the positional stability of the simulated candle end and the circuit board 4.

Figure 3:
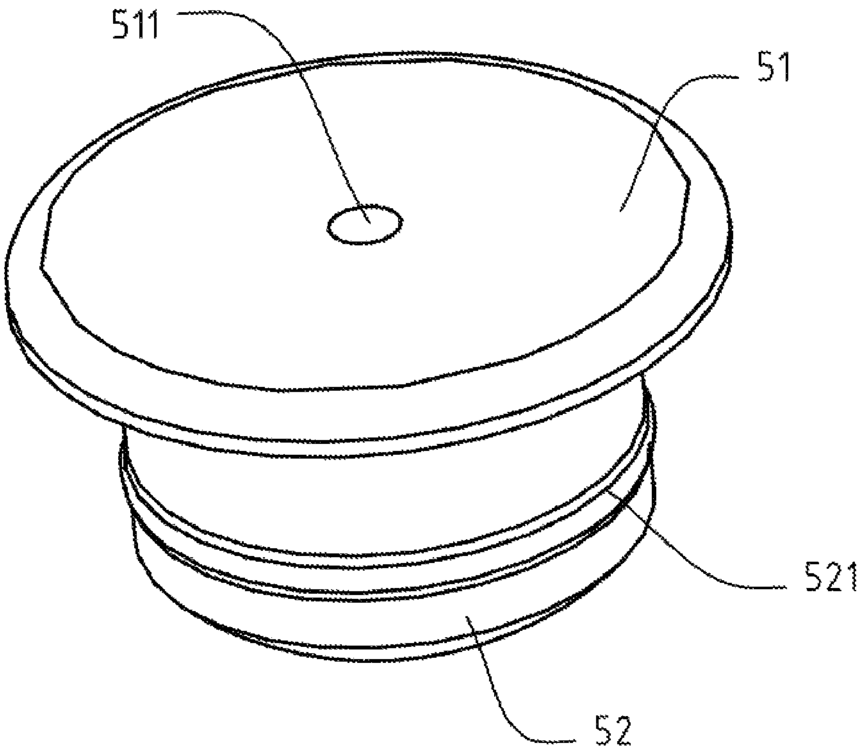
FIG. 3 is a structural schematic diagram of a candle end bottom support according to one embodiment of the present disclosure.
Figure 4:
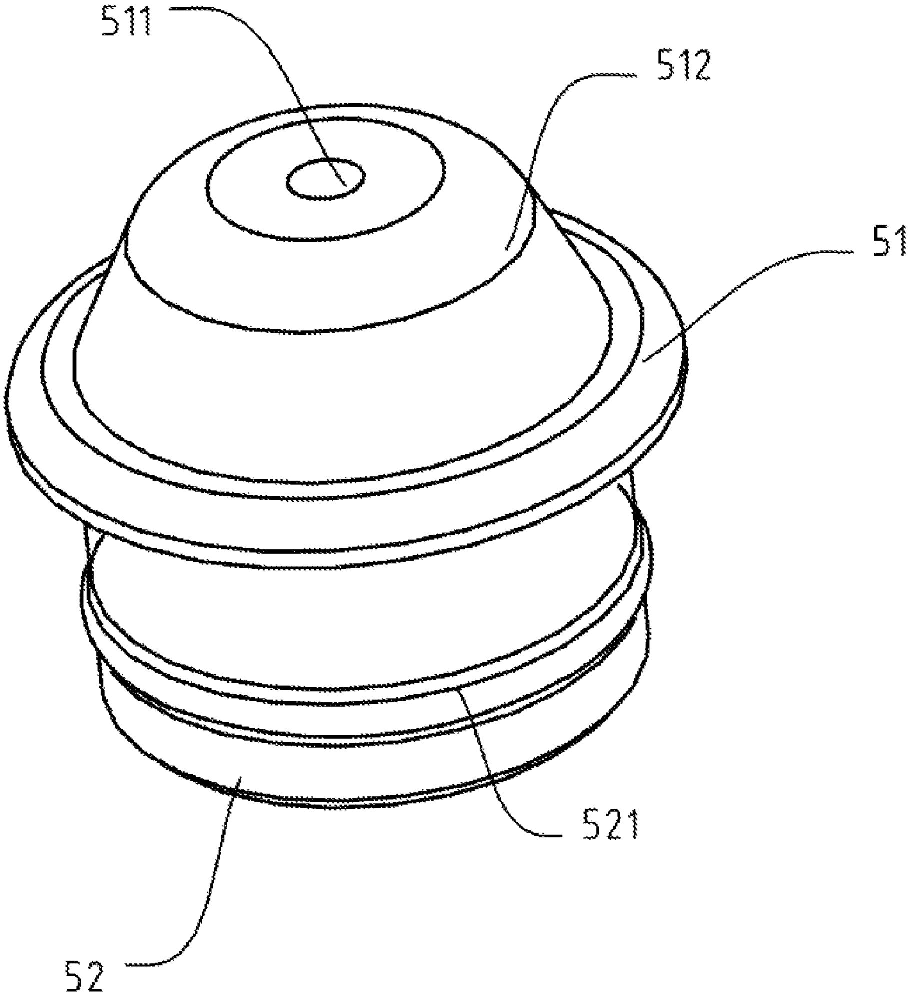
FIG. 4 is a structural schematic diagram of a candle end bottom support according to another embodiment of the present disclosure.
Figure 5:
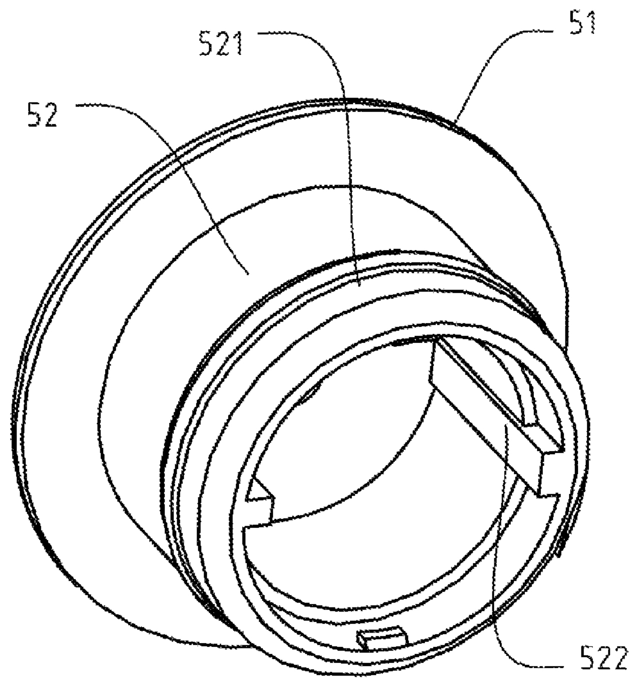
FIG. 5 is a structural schematic diagram of a candle end bottom support according to one embodiment of the present disclosure from another perspective.

In some embodiments, referring to FIGS. 3-5, the candle end bottom support 5 includes an upper support plate 51 and a lower sleeve 52 which are integrally formed, and an outer diameter of the upper support plate 51 is greater than that of the lower sleeve 52. Referring to FIG. 6, the simulated candle further includes a simulated candlestick 6 positioned under the simulated candle end, wherein the simulated candlestick 6 including a hollow housing 61, and an upper end of the hollow housing 61 is detachably connected with the candle end bottom support 5. When the lower sleeve 52 is embedded into the hollow housing 61, the upper support plate 51 is able to abut against an upper end face of the hollow housing 61. By embedding the lower sleeve 52 into the hollow housing 61, the stability of assembly of the lower sleeve 52 with the hollow housing 61 can be improved.

In some embodiments, referring to FIGS. 3-5, the lower sleeve 52 and the hollow housing 61 are assembled by interference insertion, i.e., an annular flange 521 is arranged on an outer side wall of the lower sleeve 52, and an annular groove matched with the annular flange 521 is arranged on an inner side wall of the hollow housing 61. During assembly, the lower sleeve 52 is inserted into the hollow housing 61, with the annular flange 521 in interference abutment against the inner side wall of the hollow housing 61 until the annular flange 521 enters the annular groove, and at this time, the lower sleeve 52 is inserted into and fixed to the hollow housing 61.

Further, referring to FIG. 5, a bottom support receiving cavity is defined in the lower sleeve 52, and a side wall of the bottom support receiving cavity is provided with limiting ribs 522. Referring to FIG. 1, the circuit board 4 is provided with a gap 41 capable of sleeving the limiting rib 522. The position of the circuit board 4 within the bottom support receiving cavity can be defined by the setting of the limiting ribs 522 to improve the stability of the placement of the circuit board 4.

In some embodiments, referring to FIG. 3, the upper support plate 51 is of a plane shape, and a support plate perforated hole 511 for allowing the simulating member for a cotton sewing thread on a candle wick 3 to pass through is formed in a middle of the upper support plate 51. In another embodiment, in order to improve the aesthetics of the candle end bottom support 5, referring to FIG. 4, the middle of the upper support plate 51 protrudes toward a direction close to the flame simulating member 1, and a circular truncated cone-shaped protrusion 512 is formed, and a support plate perforated hole 511 for allowing the simulating member for a cotton sewing thread on a candle wick 3 to pass through is formed in a middle of the protrusion 512. The upper end of the hollow housing 61 can be closed by the setting of the upper support plate 51 to prevent dust from entering the hollow housing 61 during use; and the connection of the simulating member for a cotton sewing thread on a candle wick 3 to the circuit board 4 located in the bottom support receiving cavity is achieved by the setting of the support plate perforated hole.

It should be noted that a functional chip and an infrared receiving head may be arranged on the circuit board 4 to enhance the performance of the circuit board 4.

Figure 7:
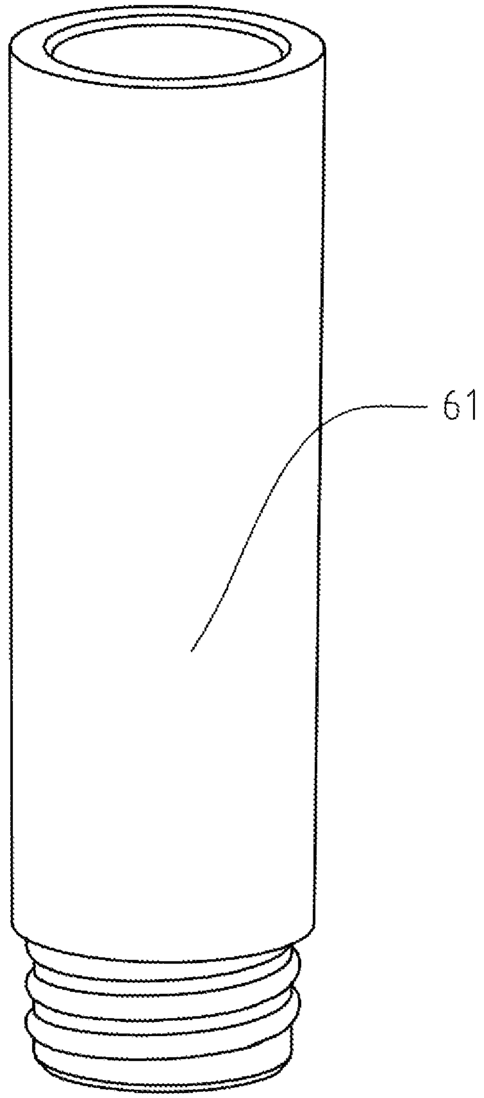
FIG. 7 is a structural schematic diagram of a hollow housing according to one embodiment of the present disclosure.
Figure 8:
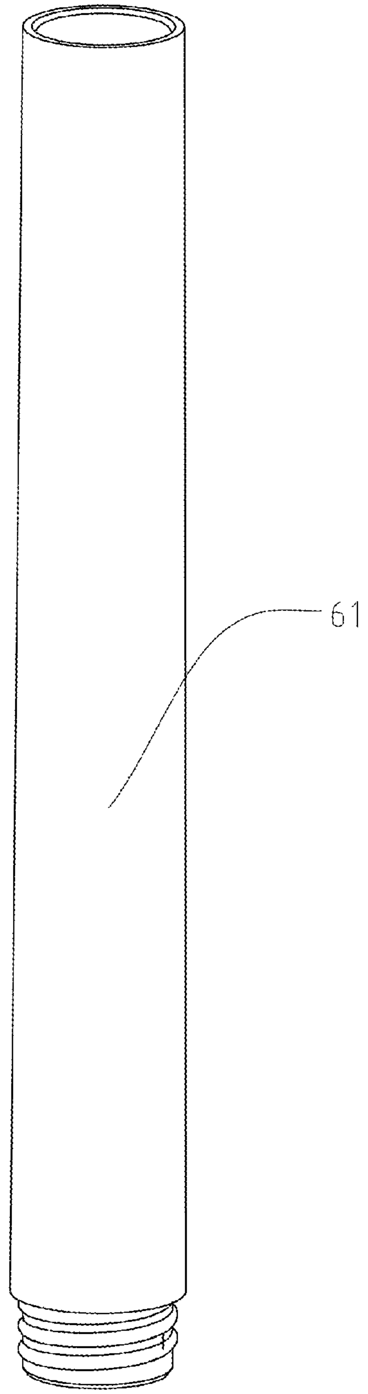
FIG. 8 is a structural schematic diagram of a hollow housing according to another embodiment of the present disclosure.
Figure 9:
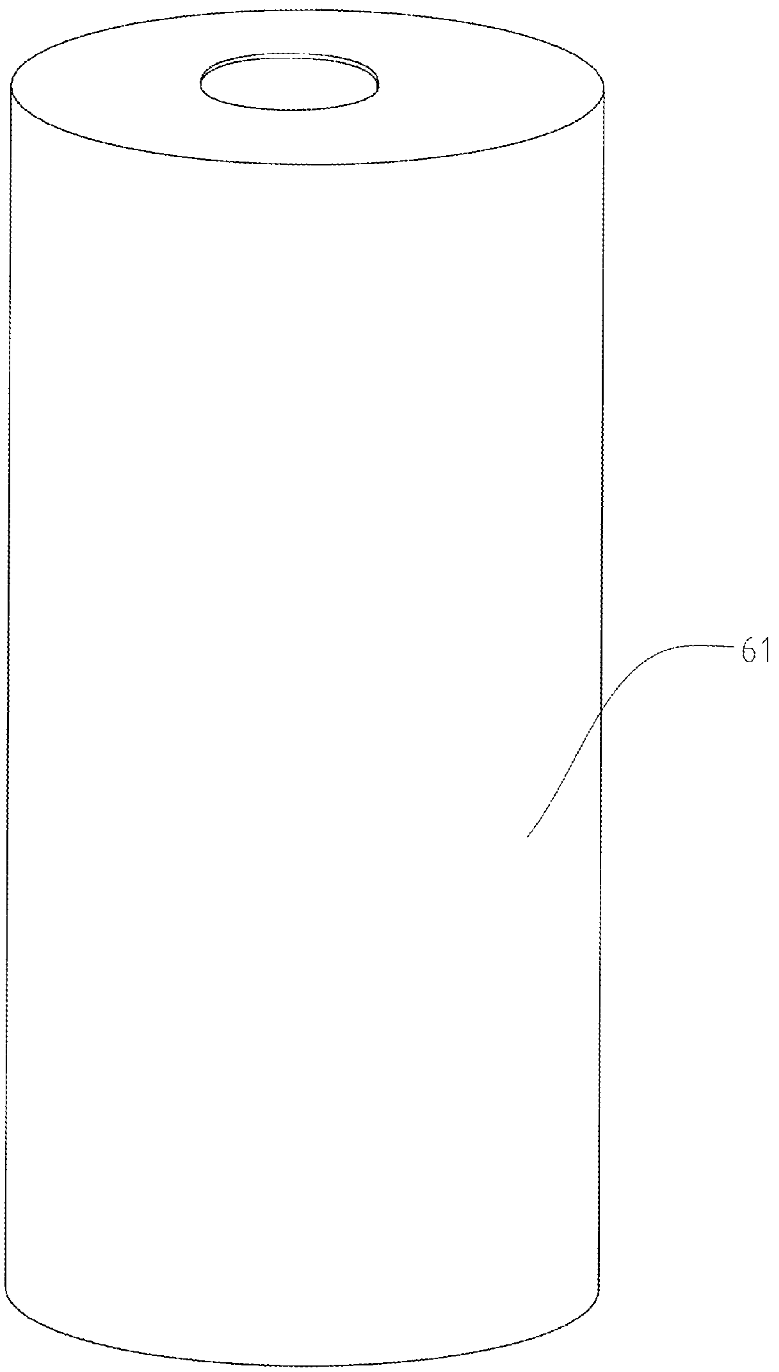
FIG. 9 is a structural schematic diagram of a hollow housing according to another embodiment of the present disclosure.

Referring to FIGS. 7-9, for aesthetic reasons, a size of the hollow housing 61 may be appropriately enlarged when a length dimension of the simulated candle is small. As shown in FIG. 8, the size of the hollow housing 61 is enlarged from the length direction, and as shown in FIG. 9, the size of the hollow housing 61 is enlarged from the width direction.

Figure 10:
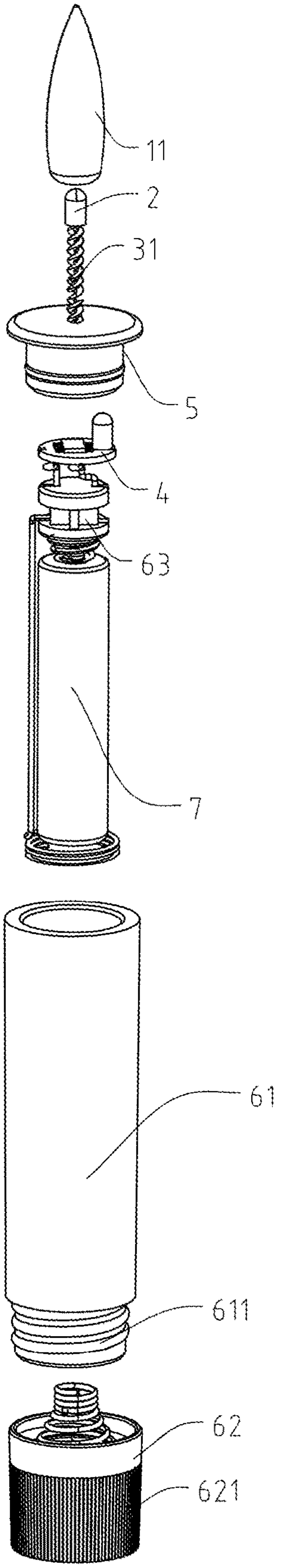
FIG. 10 is an exploded view of a simulated candle using dry batterys according to one embodiment of the present disclosure.

In some embodiments, in order to provide power to the circuit board 4, referring to FIG. 10, the simulated candle further includes a power supply assembly including at least one dry battery 7 built into the hollow housing 61. When there is one dry battery 7, a positive electrode and a negative electrode of the dry battery 7 are electrically connected to a positive electrode and a negative electrode on the circuit board 4 through guide members, respectively. When there are a plurality of dry batteries 7, the plurality of the dry batteries 7 are arranged up and down and can be connected to each other in series, a positive electrode (or a negative electrode) of the uppermost dry battery 7 and a negative electrode (or a positive electrode) of the lowermost dry battery 7 are electrically connected to a positive electrode and a negative electrode on the circuit board 4 through guide members, respectively.

In order to realize the mounting of the power supply assembly, a connecting seat 62 is detachably connected at a lower end of the hollow housing 61. Specifically, referring to FIG. 10, an external thread structure 611 is arranged on a side wall of the lower end of the hollow housing 61, and a threaded groove matched with the external thread structure 611 is formed in an upper end of the connecting seat 62. The detachable connection of the hollow housing 61 with the connecting seat is realized by the cooperation of the external thread structure 611 with the threaded groove. When the dry battery is assembled into the hollow housing 61, if there is only one dry battery, an upper end of the dry battery abuts against a fixed rod 63 inside the hollow housing 61, and a lower end of the dry battery abuts against the connecting seat 62; and if there are a plurality of dry batteries, the uppermost dry battery and the lowermost dry battery abut against the fixed rod 63 and the connecting seat 62, respectively.

Further, in order to facilitate the tightening of the connecting seat 62, referring to FIG. 10, anti-slip convex threads 621 are uniformly distributed on an outer side wall of the connecting seat 62.

Figure 11:
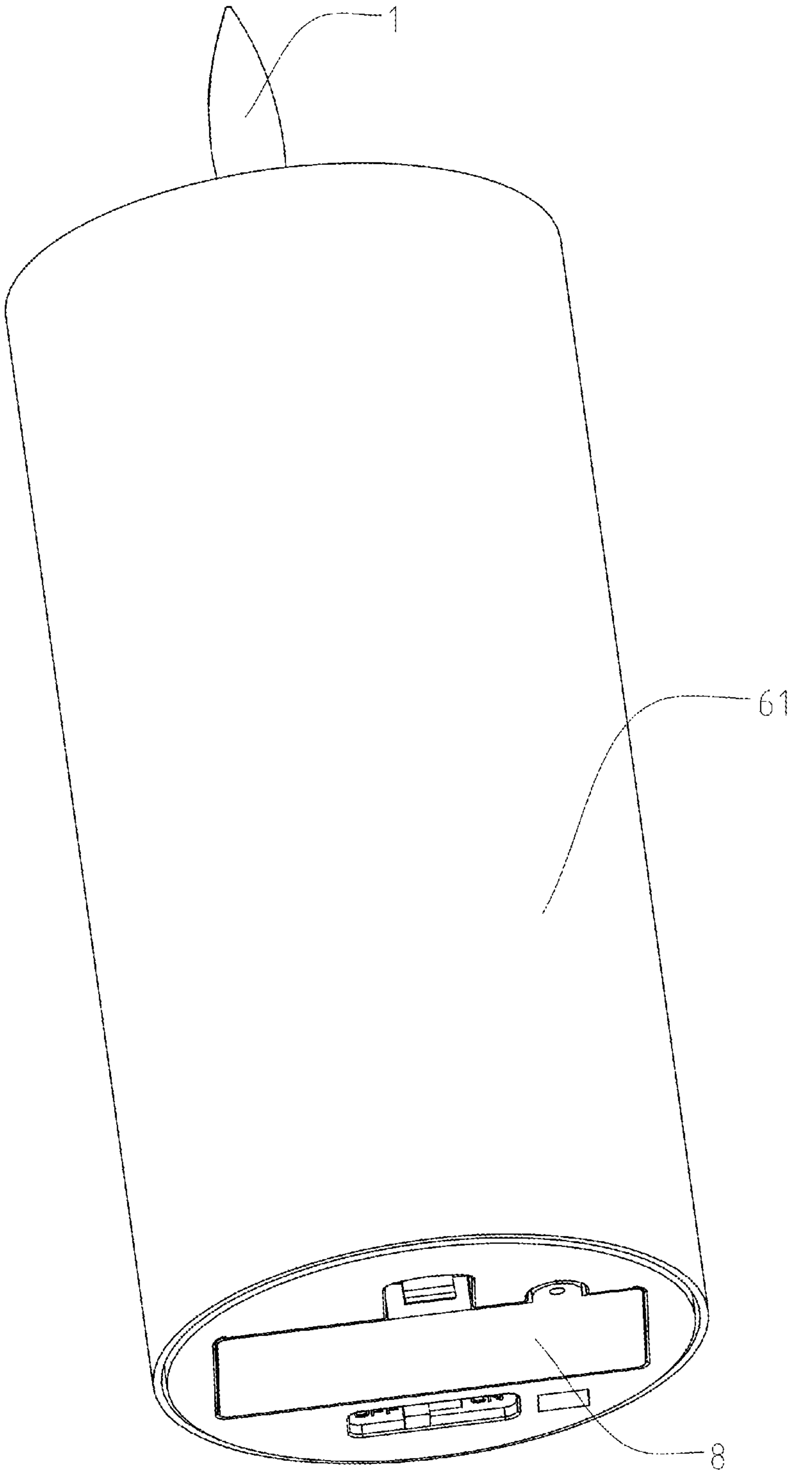
FIG. 11 is a structural schematic diagram of assembly of a battery case to a hollow housing according to one embodiment of the present disclosure.
Figure 12:
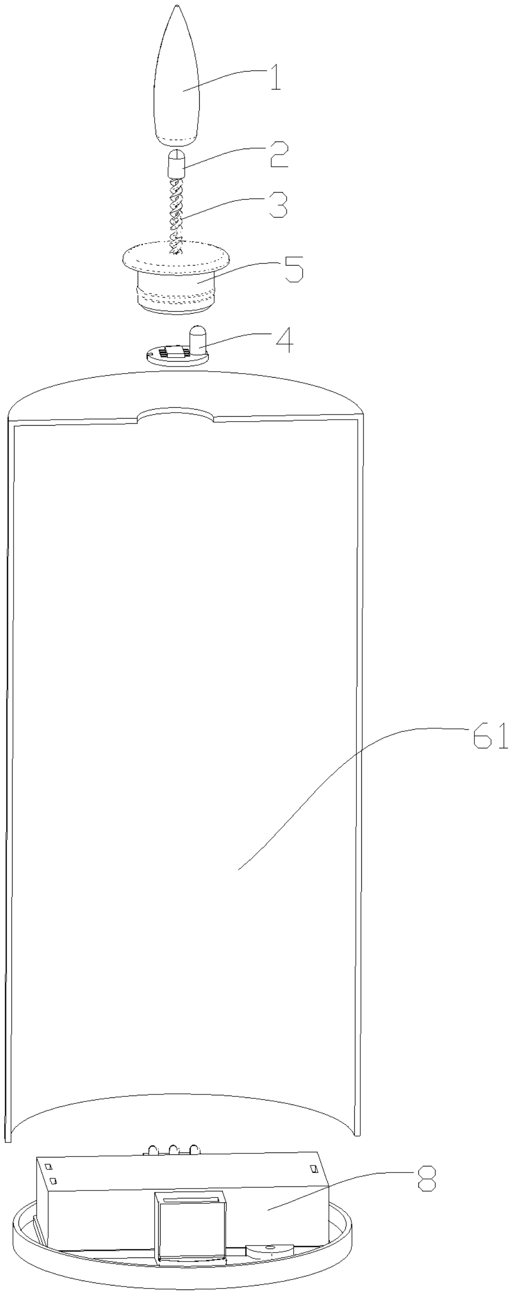
FIG. 12 is an exploded view of a simulated candle using a battery case according to one embodiment of the present disclosure.

In some embodiments, referring to FIGS. 11-12, the power supply assembly may also directly employ a battery case 8, and in this case, the battery case 8 may directly be used as a connecting seat. That is, the battery case 8 is directly detachably connected to the lower end of the hollow housing 61, and a positive electrode and a negative electrode of the battery case 8 are connected to the positive electrode and the negative electrode of the circuit board 4 by wires threaded inside the hollow housing 61. Further, the battery case 8 is clamped and fixed to the hollow housing 61.

Figure 13:
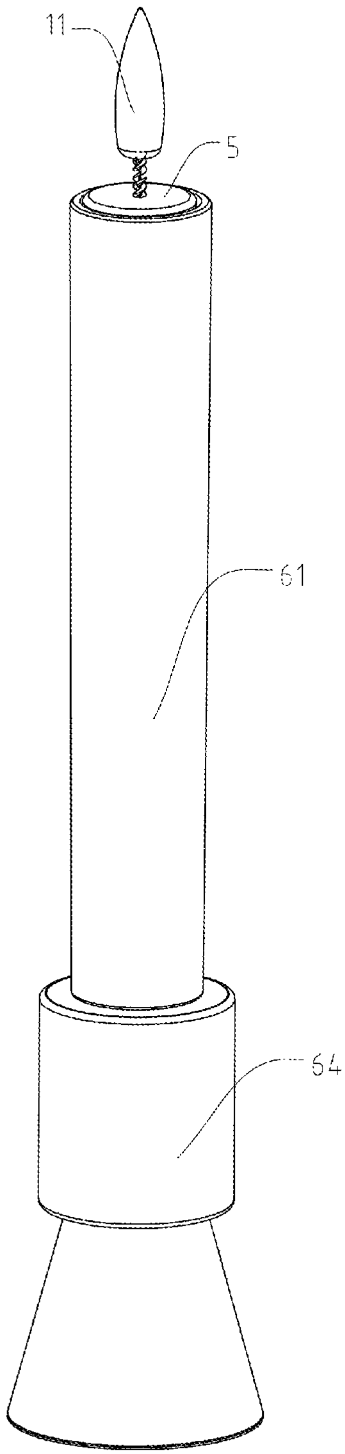
FIG. 13 is a structural schematic diagram of a candlestick base according to one embodiment of the present disclosure.
Figure 14:
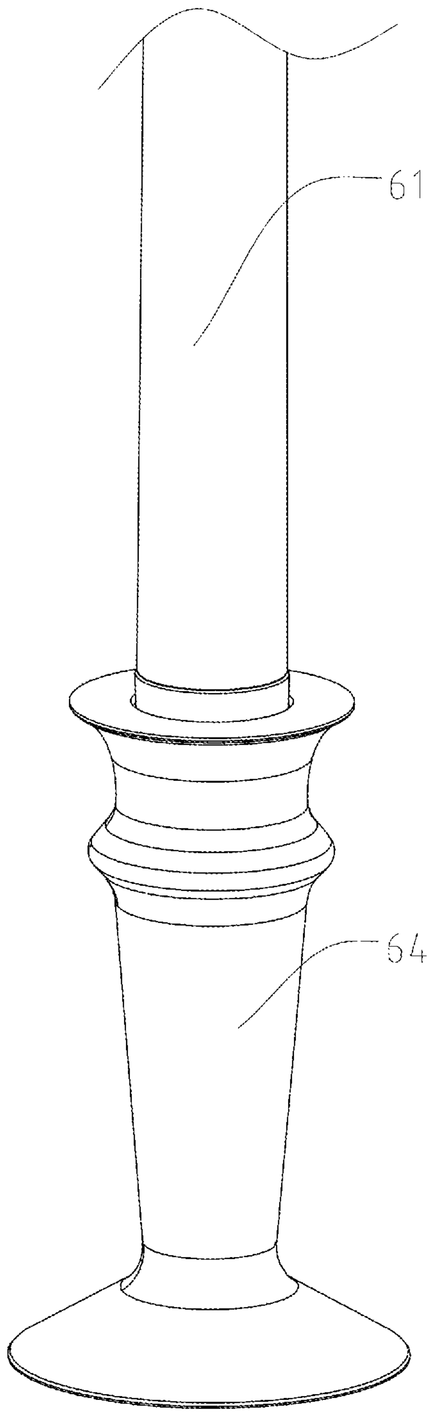
FIG. 14 is a structural schematic diagram of a candlestick base according to another embodiment of the present disclosure.
Figure 15:
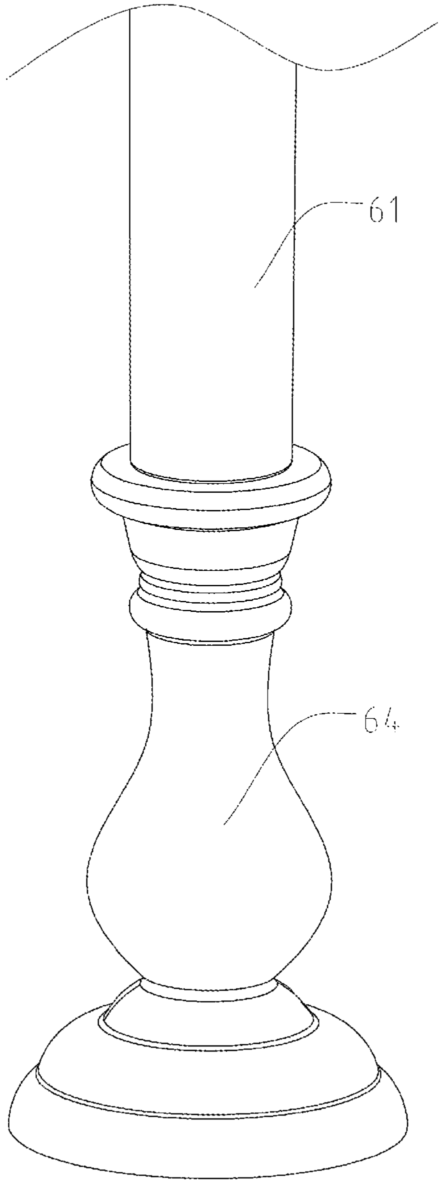
FIG. 15 is a structural schematic diagram of a candlestick base according to another embodiment of the present disclosure.

In some embodiments, in order to achieve stability of placement of the simulated candle, referring to FIGS. 13-15, the simulated candlestick 6 further includes a candlestick base 64, an upper end of the candlestick base 64 sleeves the connecting seat 62, and a radial dimension of a lower end of the candlestick base 64 is greater than that of an upper end of the candlestick base 64. The bottom support of the simulated candlestick 6 can be enhanced by the setting of the candlestick base 64 to facilitate its stable placement on a table top. It should be noted that a shape of the candlestick base 64 can be adjusted according to the actual requirements, only by ensuring that the upper end of the candlestick base 64 can support the connecting seat 62, and the lower end of the candlestick base 64 can increase its contact surface with the table top. Exemplarily, FIGS. 13, 14, and 15 respectively show differently shaped candlestick bases 64.

Figure 16:
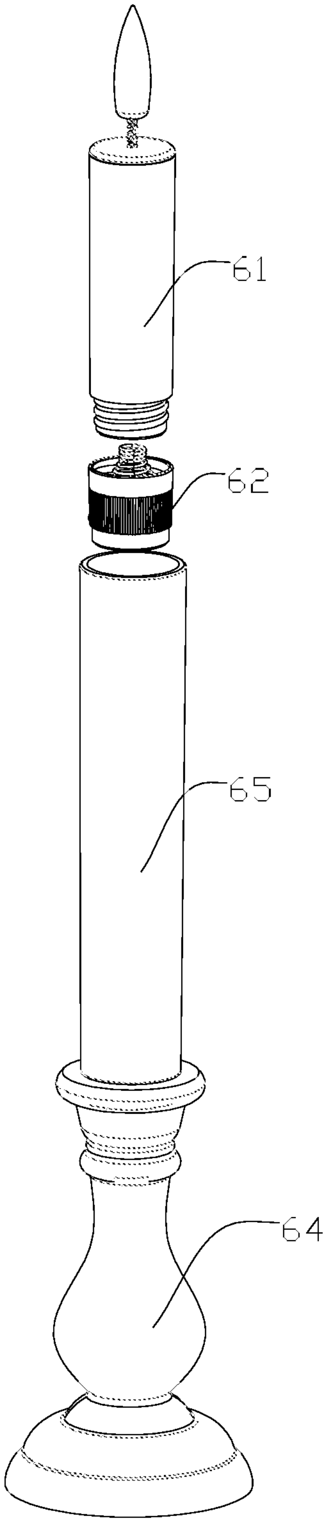
FIG. 16 is an exploded view of a simulated candlestick using protective casing according to one embodiment of the present disclosure.

In addition, since the size of the hollow housing 61 is different, when the hollow housing 61 is short in length, in order to adapt to the candlestick base 64, referring to FIG. 16, a protective casing 65 can be installed on an outer side of the hollow housing 61, a length dimension of the protective casing 65 is greater than that of the hollow housing 61, and the protective casing 65 fixedly sleeves the hollow housing 61, and an upper end of the protective casing 65 is flush with the upper end of the hollow housing 61. Since the length dimension of the protective casing 65 is greater than the length dimension of the hollow housing 61, there is a distance between the connecting seat 62 and the candlestick base 64, and the connection cannot be achieved. Therefore, when the protective casing 65 is provided, the protective casing 65 can be embedded into the candlestick base 64 to realize stable placement of the simulated candle.

Figure 17:
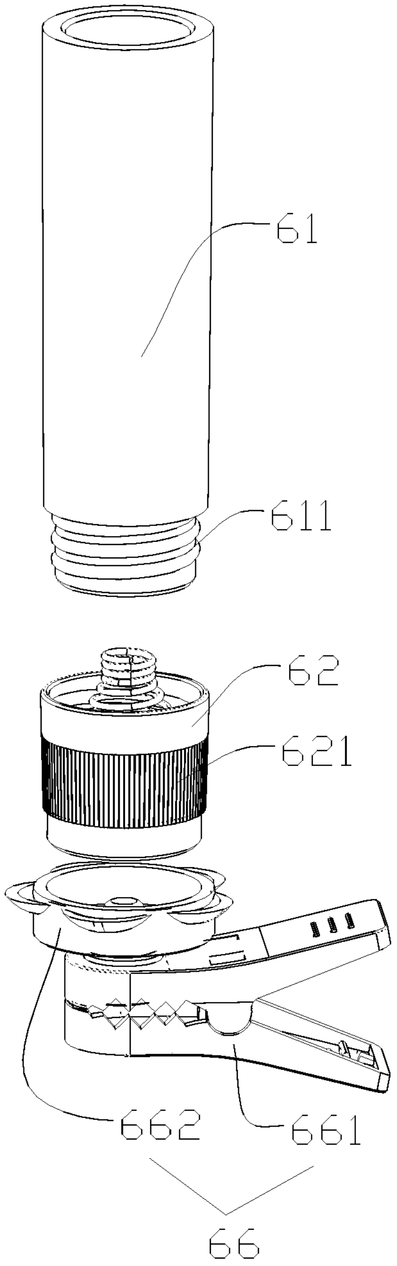
FIG. 17 is an exploded view of a hollow housing and a moving assembly according to one embodiment of the present disclosure.

In some practical application scenarios, there may be a lack of a table top on which the candlestick base 64 can be placed, or the table top may be tilted so that the candlestick base 64 cannot be placed stably. Therefore, in some embodiments, the candlestick base 64 is removed and replaced with a moving assembly that can be clamped to enhance the flexibility of the use of the simulated candle. Specifically, referring to FIG. 17, a lower end of the connecting seat 62 is detachably connected to a moving assembly. The moving assembly includes a moving clip 66 including a clip body 661 and a support platform 662 fixedly connected to the clip body 661; and the lower end of the connecting seat 62 can be embedded into the support platform 662.

It is convenient to move the simulated candle end and the simulated candlestick 6 to any clippable position by the setting of the moving assembly, improving the convenience of use; and during use, the connecting seat 62 is first connected to the hollow housing 61, the moving clip 66 is then clamped to a desired position, and the connecting seat 62 is then placed on the support platform 662.

The above embodiments are only intended to illustrate the technical concepts and features of the present disclosure, and are intended to enable those skilled in the art to understand and practice the contents of the present disclosure, and should not be construed as limiting the protection scope of the present disclosure. Equivalent variations and modifications made according to the spirit of the present disclosure are intended to be included within the protection scope of the present disclosure.

What is claimed is:

1. A simulated candle, comprising a simulated candle end, the simulated candle end comprising a flame simulating member, a light-emitting element, a simulating member for a cotton sewing thread on a candle wick, a circuit board, and a candle end bottom support; wherein the flame simulating member comprises a light transmissive profiled cover shell, and a bottom of the profiled cover shell is provided with an embedding groove;

the light-emitting element is embedded in the embedding groove, and is connected to the circuit board located outside the profiled cover shell solely by the simulating member for a cotton sewing thread on a candle wick;

the simulating member for a cotton sewing thread on a candle wick consists of at least two strands of wires twisted into a fried dough twist shape, and each strand of the wires consisting of an electric core wire and a simulation rubber sleeve wrapped outside the electric core wire;

the candle end bottom support is positioned below the flame simulating member, and a bottom support receiving cavity for receiving the circuit board is formed in the candle end bottom support; and a simulated candlestick positioned under the simulated candle end, wherein the simulated candlestick comprises a hollow housing, and an upper end of the hollow housing is detachably connected with the candle end bottom support.

2. The simulated candle according to claim 1, wherein the wires are bonded and fixed by a glue.

3. The simulated candle according to claim 1, wherein the embedding groove is located in a middle of the profiled cover shell, and a shape of an inner side wall of the embedding groove is adapted to a shape of an outer side wall of the light-emitting element.

4. The simulated candle according to claim 1, wherein the candle end bottom support comprises an upper support plate and a lower sleeve which are integrally formed, an outer diameter of the upper support plate is greater than that of the lower sleeve, and the upper support plate is able to abut against an upper end face of the hollow housing when the lower sleeve is embedded into the hollow housing.

5. The simulated candle according to claim 1, wherein the upper support plate is of a plane shape, and a support plate perforated hole for allowing the simulating member for a cotton sewing thread on a candle wick to pass through is formed in a middle of the upper support plate.

6. The simulated candle according to claim 1, wherein a middle of the upper support plate protrudes toward a direction close to the flame simulating member, and a circular truncated cone-shaped protrusion is formed, and a support plate perforated hole for allowing the simulating member for a cotton sewing thread on a candle wick to pass through is formed in a middle of the protrusion.

7. The simulated candle according to claim 1, further comprising a power supply assembly built inside the hollow housing or detachably connected at a lower end of the hollow housing; wherein the power supply assembly is electrically connected with the circuit board.

8. The simulated candle according to claim 1, wherein the simulated candlestick further comprises a candlestick base, and a radial dimension of a lower end of the candlestick base is greater than that of an upper end of the candlestick base.

9. The simulated candle according to claim 1, wherein the simulated candlestick further comprises a moving assembly, the moving assembly comprises a moving clip, and the moving clip comprises a clip body and a support platform fixedly connected to the clip body; and a lower end of the hollow housing is detachably connected with a connecting seat capable of being embedded into the support platform.

* * * * *